July 4, 1933. W. HARPER, JR 1,916,978
PISTON
Filed Feb. 10, 1930  2 Sheets-Sheet 1

Inventor
William Harper, Jr
By his Attorney

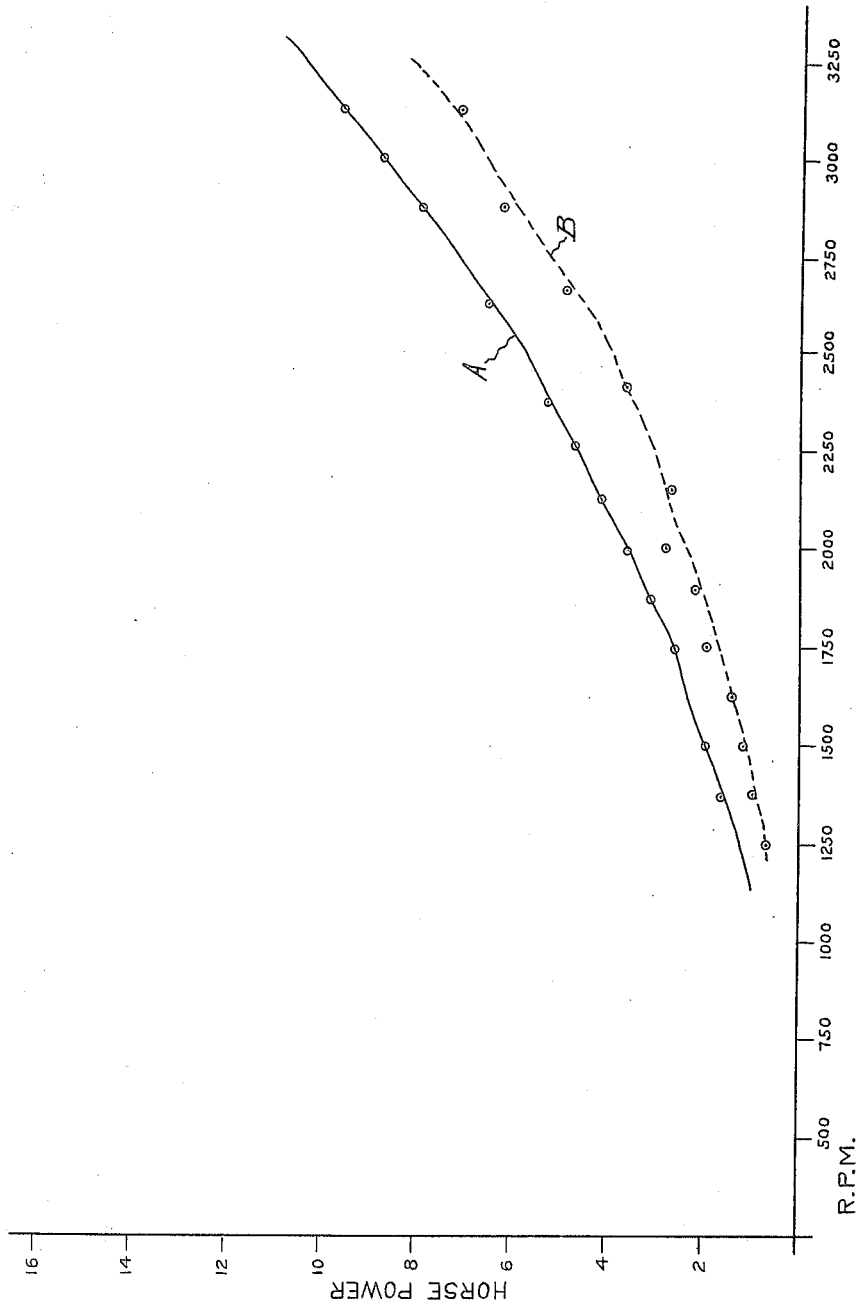

Patented July 4, 1933

1,916,978

UNITED STATES PATENT OFFICE

WILLIAM HARPER, JR., OF PORT WASHINGTON, NEW YORK

PISTON

Application filed February 10, 1930. Serial No. 427,334.

This invention relates to pistons and has for its object to provide an improved seal between a piston and a surrounding cylinder barrel, thereby reducing the friction between the piston and cylinder and increasing the over-all efficiency of the engine in which they are used.

The invention is particularly applicable to pistons used in combustion engines where the relative movement between piston and cylinder surfaces is very great. Heretofore, the common practice has been to employ spring piston rings to seal the annular space between piston and cylinder surfaces, but at high momentum and inertia rates these rings are held tightly in their grooves and do not make a good contact with the cylinder surface unless the ring tension is excessive. As a result the friction load on the piston rings is very high, in some cases amounting to half the friction of the engine.

My improved piston is a departure from the usual type in that it employs no spring sealing rings in contact with the cylinder surface, but is provided with a floating band or collar which is slipped over the piston head and fits the cylinder barrel snugly. This band is provided with annular grooves adapted to receive oil which seals the space between the band and cylinder surface, and is proportioned to effect an automatic balance between heat expansion and radiation which insures a proper running fit with the cylinder under all operating conditions.

In the preferred form of the invention, the floating band is fitted loosely about the upper periphery of the piston, providing a small annular clearance space between the two. This space is sealed by concentric snap rings at least one of which also locks the collar on the piston while permitting it to rotate thereon. The seal with the cylinder barrel is effected by the annular oil grooves formed in the outer periphery of the band, which in effect provides a ring seal without the usual rings rubbing on the cylinder wall. The material of the band, and its proportions, are such that very little clearance is necessary in fitting same to the cylinder barrel, and this clearance is reduced as the parts heat up until the band has expanded to a close running contact with the cylinder barrel. Improved means are also provided for lubricating the wrist pin bearings, and for giving the floating band a rotating movement sufficient to equalize the wear on its outer surface and to work its inside periphery to a proper fit with the packing ring seal.

The invention will be described in connection with the accompanying drawings, in which:

Fig. 8 shows curves illustrating the operating efficiency of my piston as compared with a piston having the ordinary type of ring seal.

Figure 1:
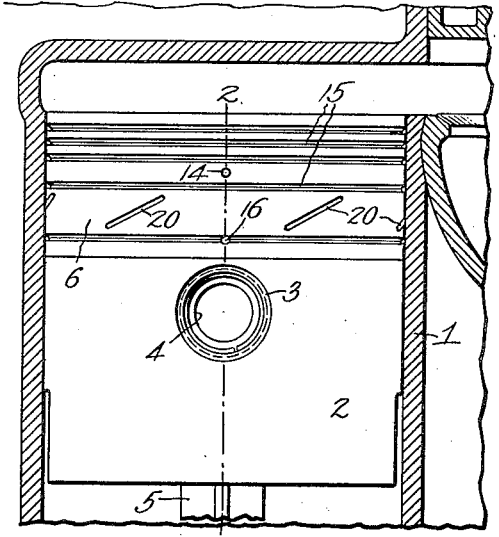
Fig. 1 is a side view of the composite piston, with surrounding cylinder in section, showing the arrangement of oil grooves in the floating band.

The drawings show a portion of a combustion engine having a cylinder 1 containing the piston 2, the latter being at the beginning of its stroke.

The body of the piston is preferably made of light material of high heat conductivity, such as aluminum, and is provided with the usual bearings 3 for the wrist pin 4 on which the piston-rod 5 is pivoted.

Figure 2:
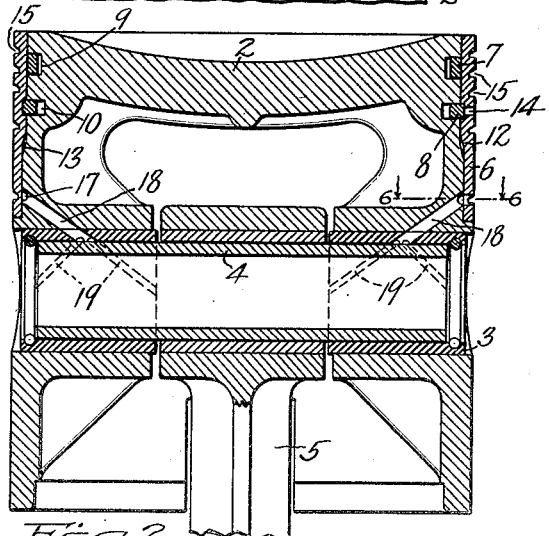
Fig. 2 is a vertical section taken on the line 2—2 of Fig. 1, showing the internal sealing and locking means, and the oil ducts for lubricating the wrist pin bearings.
Figure 5:
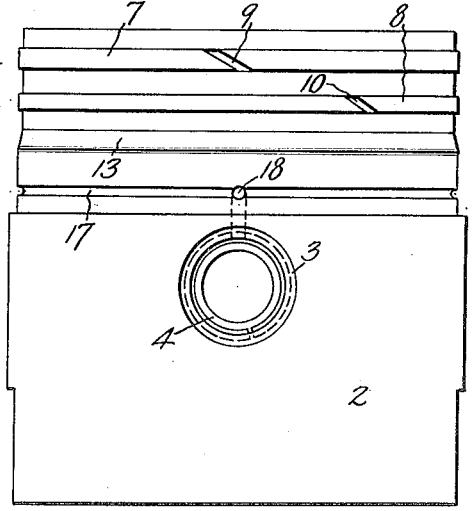
Fig. 5 is a side view of the piston with the floating band removed.
Figure 6:
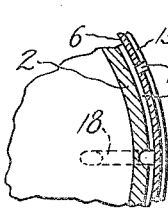
Fig. 6 is a fragmentary section taken on the line 6—6 of Fig. 2.

The continuous annular band or collar 6 is loosely fitted about the upper periphery of the piston, and for this purpose the upper portion of the piston is reduced in diameter to accommodate the band, as best shown in Figs. 2 and 5, so that the outer periphery of the band will be substantially coextensive with that of the piston skirt. Due to this loose fit there is a small annular clearance space between the periphery of the piston head and the inner surface of the band 6.

The annular space between the piston head and the band 6 is sealed by means of two narrow concentric snap rings 7 and 8 of any suitable type which fit into annular grooves 9 and 10, respectively, formed in the piston head. The ring 7 is preferably wider than the ring 8, but not so deep, as shown in Fig. 2. Both of these rings act as seals, but the lower ring 8 is so located that when the band 6 is slipped over the piston head this ring will spring into an annular groove 11 inside the band, thus locking the parts firmly together while permitting the band to rotate about the piston head. When the piston is operated at high speeds the upper ring 7 may leak, as is the case with an ordinary ring seal, but at such high speeds the lower ring 8 locks even more firmly against the lateral faces of the grooves 10 and 11 and prevents leakage through the annular space between the piston head and the band 6. The upper ring 7 also acts as a baffle keeping heat as well as carbon away from the lower ring 8.

Figure 3:
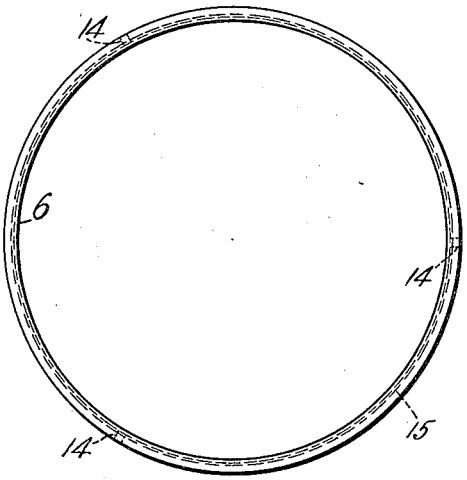
Fig. 3 is a plan view of the floating band.

The inner wall of the band 6 is provided with an annular tapered portion 12 approaching the locking groove 11 to facilitate assembly, the portion 12 mating with a corresponding tapered portion 13 on the piston head after the parts are assembled. The band 6 may be removed, if desired by means of any suitable tool having pins adapted to fit into holes 14 which register with the locking groove 11 and enable the locking ring 8 to be depressed so that the band 6 may be slipped off the piston head. Three spaced holes 14 are sufficient for this purpose, as indicated in Fig. 3.

Figure 4:
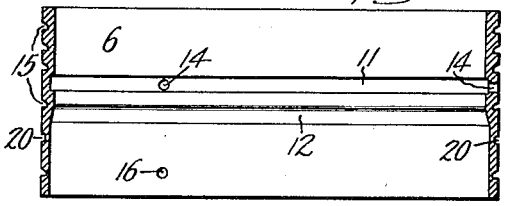
Fig. 4 is a cross-section of the band, showing the formation of the inner periphery.

The oil seal between piston and cylinder is effected by means of a plurality annular oil grooves 15 which are formed in the outer periphery of the band 6. The upper wall of each of these grooves is tapered slightly downward, as shown in Figs. 2 and 4, the pitch of the grooves determining the flow of oil which the piston receives from the crankcase or elsewhere depending upon the type of engine. The lowermost oil groove 15 has a plurality of holes 16 which extend through the band 6 and register with an annular groove 17 in the piston head. Oil ducts 18 extend through the piston head, connecting the groove 17 with suitable grooves 19 formed in the inner surface of the wrist pin bearings 3 to lubricate same.

The floating band 6 may be made of the same material as the cylinder 1, such as cast iron or hardened steel, but is preferably made of a light alloy or material such as beryllium for example an alloy of beryllium and aluminum containing from 60 to 80 percent beryllium, having substantially the same coefficient of expansion as the cast iron or other cylinder material. The piston seal in the cylinder barrel is attained by a reasonably tight running fit of the band 6 the heat expansion of which is controlled by the pressure of its outside surface with the cylinder barrel, the area of this surface being very great in proportion to the small annular thickness of the band. Hence, the more the band expands from heat absorbed from its upper edge, the greater will be its cylindrical area contact and consequently the higher the rate of heat dissipation. As a result, an automatic balance is maintained between heat expansion and heat radiation so that as long as proper lubrication is maintained the band 6 will not bind in the cylinder barrel. I have used a floating band in which the area of the outer surface was approximately 8.64 square inches, and the area of the annular edge approximately .7 square inch, and, in general, have found a desirable ratio of these areas to be approximately 12 to 1.

A small amount of heat is radiated to the band 6 from the body of the piston, but inasmuch as the annular clearance space eliminates actual contact between the band and piston body except through the packing rings 7 and 8, the convection of heat can be controlled. The proper clearance, of course, is allowed for the actual piston and piston skirt in proportion to its temperature and diameter, but very little clearance is necessary in the fit of the floating band to the cylinder, and this is automatically reduced as the engine heats up until the band has expanded to a very close running contact with the cylinder barrel.

The operating efficiency of the piston of this invention is illustrated graphically in Fig. 8, showing the results of tests conducted with a rotary cylinder combustion engine of the type shown in my Patent #1,722,260, dated July 30, 1929. The ordinates in this chart represent the horse power consumed in overcoming the friction load of a given type of piston, and the abscissæ the speed of the cylinder rotor in R. P. M. The upper full line curve A represents the ordinary type of piston having two packing rings as in Figs. 1 and 2 of Patent #1,722,260, while the lower dotted line curve B represents my improved piston. At 1250 R. P. M. the friction load with the ordinary type of piston rings is approximately 1.25 horse power (curve A), and at 2000 R. P. M. is approimately 3.75 horse power. Beyond this point the friction increases sharply, reaching 10.5 horse power at 3250 R. P. M. Substituting my improved piston in the same engine, the friction load at 1250 R. P. M. is only .75 horse power, and at 3250 R. P. M. is less than 8.25 horse power, showing a substantial reduction of power consumption ranging from about 40 per cent at the lowest speed to about 20 per cent at the highest speed recorded.

Since the band 6 is free to rotate about the piston head it will distribute its wear uniformly. Such small rotating movement as is desired for this purpose, and also to work the inner surface of the band to a proper fit with the packing ring seal, is aided by diagonal oil grooves 20 arranged about the outside periphery of the band. The rotating movement of the band 6 also prevents carbon from collecting solidly in the annular space between the band and the piston body.

Figure 7:
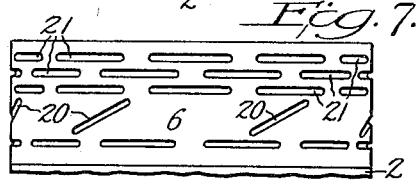
Fig. 7 is a fragmentary view showing a different arrangement of oil grooves in the floating band.

Fig. 7 shows a modification of the invention in which the oil seal is effected by means of a plurality of short intercepted oil grooves 21 arranged about the periphery of the band 6. This arrangement is especially adapted to a two cycle ported cylinder, so that there will be no direct passage around the periphery of the band 6 such as would permit leakage between inlet and exhaust ports.

It will be evident that the invention is capable of various modifications and adaptations not specifically described but included within the scope of the appended claims.

The invention claimed is:

1. A piston comprising a body portion of circular cross-section having an annular groove in its periphery, a snap ring in said groove, and a continuous annular band disposed about said body portion having a groove receiving said snap ring whereby said band is locked to said body portion and said ring will prevent leakage of gases between said band and body portion.

2. A piston comprising a body portion of circular cross-section having a plurality of annular grooves about its periphery, an annular band disposed loosely about said body portion providing a small clearance space between adjacent surfaces of the band and body portion, snap rings disposed in the grooves in said body portion to seal said air space, and an annular groove in said band cooperating with one of said snap rings to lock said band and body portion together while permitting relative rotation between them.

3. A piston comprising a body portion of circular cross-section having wrist pin bearings and oil ducts leading to said bearings from the periphery of said body portion, an annular band surrounding the piston head and covering said oil ducts, means for locking said band on said body portion, a plurality of annular oil grooves in the outer periphery of said band, and means connecting one of said grooves with said oil ducts to lubricate said wrist pin bearings.

4. A piston comprising a body portion of circular cross-section having wrist pin bearings and an annular oil groove about its periphery with oil ducts leading to said bearings, an annular band surrounding the piston head having holes registering with said oil groove, and means for locking said band and body portion together while permitting relative rotation between them.

5. A piston comprising a body portion of circular cross-section having wrist pin bearings and an annular oil groove about its periphery with oil ducts leading to said bearings, an annular band surrounding the piston head and covering said oil groove, and means for locking said band on said body portion while permitting the band to rotate, said band having a plurality of oil grooves in its outer periphery and connections from one of said grooves to the oil groove in said body portion.

6. A piston comprising a body portion of circular cross-section having a plurality of annular grooves about its periphery, an annular band disposed loosely about said body portion providing a small clearance space between adjacent surfaces of the band and body portion, snap rings disposed in the grooves in said body portion to seal said clearance space, one of said snap rings frictionally engaging the inner surface of said band, and an annular groove in said band cooperating with another of said snap rings to lock said band and body portion together while permitting relative rotation between them.

7. The combination with a cylinder, of a composite piston therefor comprising a body portion of circular cross-section, a continuous annular band adapted to slide over a portion of the piston head and having its outer surface in close running contact with the cylinder barrel, means for locking said band on said body portion while permitting the band to rotate, a plurality of annular grooves in the outer periphery of said band adapted to receive oil to seal the space between said band and cylinder barrel, and a pluraltiy of diagonal oil grooves in the outer periphery of said band to facilitate rotation thereof.

8. The combination with a cylinder, of a composite piston therefor comprising a body portion of circular cross-section composed of a material of high heat conductivity, a thin annular band surrounding the piston head and composed of material having substantially the same coefficient of expansion as the cylinder barrel, said band having its outer periphery in close running contact with the cylinder barrel and its inner surface separated from the body of the piston by a small annular clearance space, a snap ring sealing said clearance space and locking said band on said body portion while permitting the band to rotate, and grooves in the outer periphery of said band adapted to receive oil to seal the space between said band and cylinder barrel.

9. The combination with a cylinder, of a composite piston therefor comprising a body portion of circular cross-section composed of a material of high heat conductivity, a thin annular band surrounding the piston head and composed of material having substantially the same coefficient of expansion as the cylinder barrel, said band having its outer surface of much greater area than its annular thickness in close running contact with the cylinder barrel and having its inner surface separated from the body of the piston by a small annular clearance space, narrow snap rings sealing said clearance space and locking said band on said body portion while permitting the band to rotate, and grooves in the outer periphery of said band adapted to receive oil to seal the space between said band and cylinder barrel.

10. A piston comprising a body of circular cross-section consisting of a head portion and a skirt portion, a continuous annular band surrounding the head portion and having its periphery in substantial alignment with the periphery of the skirt portion, a snap ring locking the band on the body while permitting said band to rotate and for preventing leakage of gases between said band and body portion, and annular oil grooves in the periphery of said band.

11. The combination with a cylinder, of a composite piston therefor comprising a body of circular cross-section having a portion adjacent the end thereof reduced in diameter, a continuous annular band surrounding said reduced portion and having its periphery in close running contact with the cylinder barrel and in substantial alignment with the periphery of the piston skirt, removable means locking said band on said body and preventing leakage of gases between said band and body while permitting said band to rotate, and grooves in the periphery of said band adapted to receive oil to seal the space between said band and the cylinder wall.

12. A piston comprising a body portion of circular cross-section, a continuous annular band disposed loosely about said body portion providing a small clearance space between adjacent surfaces of the band and body portion, and flexible locking means between the adjacent surfaces of the band and body portion to lock them together and to prevent leakage of gases between said band and body portion.

13. A piston comprising a body portion of circular cross-section, a continuous annular band disposed loosely about said body portion providing a small clearance space between adjacent surfaces of the band and body portion, and a snap ring sealing said clearance space so as to prevent leakage of gases therethrough and connecting the adjacent surfaces of the band and body portion.

14. The combination with a cylinder, of a composite piston therefor comprising a body portion of circular cross-section, a continuous annular band disposed about said body portion having its outer surface in close running contact with the cylinder barrel and its annular edge surrounding the head of the piston and exposed to direct contact with the cylinder gases, the area of the outer surface of said band being much greater than the area of its annular edge, and flexible locking means between the adjacent surfaces of the band and body portion to lock them together and to prevent leakage of gases between said band and body portion.

15. The combination with a cylinder, of a composite piston therefor comprising a body portion of circular cross-section composed of a material of high heat conductivity, a thin annular band surrounding the piston head and composed of a light alloy of beryllium having substantially the same coefficient of expansion as the cylinder barrel, said band having its outer surface in close running contact with the cylinder barrel and its inner surface separated from the piston head by a small annular clearance space, and flexible locking means between the adjacent surfaces of the band and piston head to lock them together and to prevent leakage of gases through said space.

Signed at New York, in the county of New York and State of New York, this 28th day of January, A. D. 1930.

WILLIAM HARPER, Jr.